United States Patent [19]
Lu et al.

[11] Patent Number: 5,885,708
[45] Date of Patent: Mar. 23, 1999

[54] ANTISTATIC LATEX ADHESIVES

[75] Inventors: Ying-Yuh Lu, Woodbury, Minn.; Steven D. Yau, Austin, Tex.

[73] Assignee: Minnesota Mining and Manufacturing Company, St. Paul, Mich.

[21] Appl. No.: 801,093

[22] Filed: Feb. 14, 1997

[51] Int. Cl.$^6$ .................................................. C09J 7/02
[52] U.S. Cl. ................................... 428/353; 428/355 AC; 523/335; 525/196; 525/201; 525/274; 525/366
[58] Field of Search ........................... 523/335; 525/196, 525/201, 274, 366; 428/353, 355 AC

[56] References Cited

U.S. PATENT DOCUMENTS

| | | | |
|---|---|---|---|
| 3,104,985 | 9/1963 | Williams et al. | 117/226 |
| 3,922,464 | 11/1975 | Silver | 428/355 AC |
| 4,548,862 | 10/1985 | Hartman | 428/323 |
| 4,606,962 | 8/1986 | Reylek et al. | 428/148 |
| 4,749,612 | 6/1988 | Borkowski et al. | 428/246 |
| 5,216,536 | 6/1993 | Agrawal | 359/274 |
| 5,248,522 | 9/1993 | Araki | 427/173 |
| 5,338,490 | 8/1994 | Dietz | 252/500 |
| 5,378,405 | 1/1995 | Gutman et al. | 252/62 |
| 5,508,107 | 4/1996 | Gutman et al. | 428/339 |
| 5,779,632 | 7/1998 | Dietz | 600/391 |

FOREIGN PATENT DOCUMENTS

| | | | |
|---|---|---|---|
| 0422919A2 | 4/1991 | European Pat. Off. | C09J 7/02 |
| 0276691B1 | 10/1991 | European Pat. Off. | C09J 133/08 |
| 0508722A1 | 10/1992 | European Pat. Off. | H01B 1/22 |
| 61-272279 | 12/1986 | Japan | C09J 7/02 |
| 63-012681 | 1/1988 | Japan | C09J 07/02 |

*Primary Examiner*—Jenna Davis
*Attorney, Agent, or Firm*—Darla P. Fonseca

[57] ABSTRACT

A latex antistatic adhesive comprising an emulsion of polymerized microdrops dispersed in an aqueous medium, having an average diameter less than about 0.1 μm, and a glass transition temperature (Tg) of from about −120° C. to about 25° C., wherein the polymerized microdrops are derived from emulsion microdrops of reactive monomers, said adhesive including at least one (meth)acrylic monomer, at least one polar monomer, at least one reactive oligomer and at least 1% of a lithium salt.

5 Claims, 1 Drawing Sheet

ANTISTATIC LATEX ADHESIVES

BACKGROUND OF THE INVENTION

1. Field of the Invention

The invention relates to antistatic water-based, latex pressure sensitive adhesives using inherently low tribocharging adhesive polymers to provide protection for sensitive electronic devices. Low tribocharging adhesive tapes for use in microfabrication processes are provided.

2. Description of the Art

The use of acrylic polymers as pressure sensitive adhesives is well known in the art. Early preparation of acrylic adhesive compositions relied on solution polymerization techniques using significant quantities of organic solvents. Current trends demand severe reduction in solvent usage for the benefit of the environment and also to curtail costs incurred with expensive solvents.

Alternative methods to solution polymerization include suspension and emulsion polymerization. Both may be used to provide copolymer pressure sensitive adhesives. In emulsion polymerization a reaction occurs in micelles or emulsion microdrops suspended in aqueous medium. Any heat generated in the microdrops or micelles is quickly moderated by the effect of the heat capacity of the surrounding water phase. Emulsion polymerization proceeds with better control of exothermic reactions, and the resulting adhesive composition is non-flammable as the aqueous medium is the dominant component.

Offsetting these advantages is the energy required to evaporate water from the coated latex adhesives. The heat required is about five times the quantity typically used for a comparable solution adhesive. Less water in the adhesive would reduce the heat requirement. A reduction in water is likely, however, to lead to undesirable thickening of the emulsion. Ideally, a high solids, low viscosity emulsion will provide a variety of benefits. Unfortunately, sensitivity to moisture is a serious problem. Latex adhesives contain surfactant materials that attract water. Once affected by water, the adhesive may become cloudy, losing both adhesion and shear strength. A means to eliminate moisture sensitivity would yield superior adhesives for applications involving exposure to quantities of water, especially pressurized jets of water typically used in microfabrication processes.

European published application EP 0554832A discloses a water-based, high solids, moisture insensitive, latex pressure sensitive adhesive which has low coating viscosity as well as high shear, high compliance and controlled adhesion build-up. Suitable for a wide range of applications, this adhesive composition is however, not suitable for use with sensitive electronic devices that are subject to damage by electrostatic discharge. Use of antistatic adhesives in microfabrication processes reduces the incidence of electrostatic charge build-up followed by discharge in the proximity of sensitive electronic devices. Such discharge is known to damage devices rendering them useless for their intended function which adds to the failure rate and associated costs.

Microcircuit fabrication processes use pressure sensitive adhesive products at various stages of manufacture. With advances in miniaturization, circuit components became more susceptible to damage by electrostatic discharge. Therefore any source of electrostatic discharge, in the microcircuit fabrication process, could result in faulty microdevices. In wafer dicing operations, the required combination of tape characteristics includes good adhesion, water resistance, clean removability and lack of static discharge, a combination not easy to achieve.

Adhesive polymers have traditionally been a source of static charge. U.S. Pat. No. 5,378,405, incorporated herein by reference, was the first to disclose non-tribocharging, pressure sensitive adhesives wherein the adhesive polymer itself, in microparticulate form, is conductive.

U.S. Pat. No. 5,508,107 extends the application of antistatic microparticulate adhesives to operations that convert semiconductor wafers, supporting multiple integrated circuit chips, into individual chips. No evidence exists in the prior art for inherently low-tribocharging latex adhesive compositions.

A number of methods are known for preparing antistatic adhesive compositions by adding conductive moieties to conventional adhesive formulations. Antistatic species may be introduced as conductive materials such as electrically conductive metal or carbon particles. Compositions of this type are disclosed in various references including EP 0276691A, EP 0518722A, U.S. Pat. No. 4,606,962, EP 0422919A, U.S. Pat. Nos. 3,104,985, 4,749,612 and 4,548,862.

The addition of ionic materials to reduce generation of static charge is also known. Suitable materials of this type include ion conducting species such as those disclosed in Japanese patents JP 61,272,279 and JP 63,012,681.

Adhesive tapes of the present invention extend the scope of the antistatic adhesive concept to a broader range of adhesives. They provide latex adhesives which, coated on suitable substrates, prevent build up of static charge during use in microfabrication operations and similar situations requiring freedom from electrostatic discharge. Although disclosures in U.S. Pat. No. 5,378,405 suggest that latex formation is undesirable to the preparation of antistatic adhesives, the current inventors discovered adhesive latex compositions that fully satisfy requirements. The effect is so pronounced that tapes of the current invention are essentially non-tribocharging, even at low humidities.

Further, adhesive formulations of the invention and tapes made therewith exhibit transparency. In certain embodiments, optical clarity is exhibited.

Further, adhesives formulations of the invention can be designed with a variety of adhesion levels, depending on what is desirable for the specific application. For microfabrication applications, low adhesion is usually desirable, e.g., less than about 22N/100 mm. For some applications, adhesion values as low as 3.5N/100 mm are desired.

Latex adhesives differ from microparticulate adhesives, as described in U.S. Pat. No. 5,378,405, in the characteristics of the adhesive layers produced by coating the adhesives on suitable substrates. Typical latex compositions form uniform layers when polymerized microdrops coalesce, as water evaporates from the coating, during drying. Microparticles, on the other hand, do not possess sufficient fluid character for interparticulate coalescence. As a result, microparticle coatings contain individual particles which tend to cause relative surface roughness and opacity when compared to the transparent, planar-surfaced latex adhesive coatings.

SUMMARY OF THE INVENTION

The invention provides antistatic latex adhesive compositions useful in electrical or electronic applications, especially electronic device microfabrication processes. Suitable latex adhesive compositions comprise polymerized microdrops dispersed in an aqueous medium.

Useful polymerized microdrops include compositions of monomers submitted to conditions that cause polymerization of the monomers. Suitable monomers include acrylate and substituted acrylate monomers. The polymerized microdrops also possess ionic conductivity associated with incorporation of polymer electrolyte throughout the structure of the polymerized microdrops or located in a surface layer of the polymerized microdrops. In this latter case the polymerized microdrops have a core/shell structure. Such compositions exhibit varied adhesive properties as desired by changing the characteristics of either the core or the shell.

More specifically an antistatic adhesive of the invention comprises an emulsion of polymerized microdrops dispersed in an aqueous medium, such polymerized microdrops having an average diameter less than about 1.0 $\mu$m, the composition having a glass transition temperature (Tg) from about $-120°$ C. to about $25°$ C., wherein the polymerized microdrops are derived from compositions formed from reactive monomers, said compositions including at least one $C_4$–$C_{14}$ (meth)acrylic monomer, at least one polar monomer, at least one reactive oligomer and at least 1% of a lithium salt.

In the embodiment of the invention having core/shell type polymerized microdrops, the latex antistatic adhesive contains a majority of said polymerized microdrops which have an inner core differing in composition from an overlying shell that substantially surrounds the inner core, wherein the core has a glass transition temperature of from about $-120°$ C. to about $25°$ C., and the overlying shell includes means to subdue static charge, both the inner core and overlying shell being derived from compositions formed from reactive monomers, wherein the compositions include at least one $C_4$–$C_{14}$ (meth)acrylic monomer, at least one polar monomer, as well as the reactive oligomer and at least 1% of a lithium salt.

Preparation of a shell-free latex adhesive of the invention requires a single step process for homogenous polymerized microdrops and a multi-step process where the dispersed phase comprises core/shell type polymerized microdrops.

The single step process requires emulsification of a mixture of water, reactive monomers, reactive oligomer, and any optional ingredients such as a hydrophobic polymer, a chain transfer agent and/or a crosslinker. Polymerization of the emulsion proceeds by heating, with agitation under a blanket of nitrogen. Addition of initiator in controlled quantities prevents excessive exotherm and helps maintain the reaction temperature in a desired range.

Preparation of latex adhesives containing core/shell polymerized microdrops requires several steps. In the first step, a reaction vessel is charged with water, optionally lithium hydroxide and potassium persulfate initiator and controlled at a suitable temperature for polymerization of monomers used to form the core of the polymerized microdrop. A metering device provides an effective means to gradually add the core forming monomer composition to the reaction vessel. The monomer composition is a pre-blended emulsion comprising water, surfactant, acrylate monomers and methacrylate monomers.

Upon completion of the core forming reaction, a premixed monomer, added to the reaction vessel using a metering pump, provides material to form a polymer shell around the core of the polymer domain. The shell comprises acrylate and methacrylate monomers mixed with reactive oligomers having suitable functionality to participate in the polymerization reaction. After adding the premixed monomer, a further quantity of potassium persulfate initiator sustains polymerization for an extended period to reduce residual monomer content.

As used herein, these terms have the following meanings.

1. The term "emulsion microdrop" means a microdrop of the dispersed phase of an emulsion wherein the microdrop comprises a mixture of unreacted monomers.

2. The term "polymerized microdrop" means a microdrop of the dispersed phase of an emulsion wherein the microdrop has been converted, by suitable polymerization, from a mixture comprising monomers to a polymerized condition. Polymerized microdrops can coalesce with other similar polymerized microdrops upon removal of water from the emulsion.

3. The term "reactive oligomer" refers to a molecule having dual functionality. Dual functionality is important for successful practice of the invention. One aspect of the functionality provides unsaturation suitable for participating in free radical-type polymerization reactions. The second aspect of dual functionality resides in the alkoxy substituted moiety that is available, as an electron donor, to associate with positively charged ions.

4. The term "alkoxy substituted moiety" means a functional group containing an atom, usually oxygen, that has electronic charge available for sharing with positively charged ions such as $Li^+$.

5. The term "polar monomer" means a monmeric species of sufficient ionic character to be substantially soluble in water.

6. The term "core/shell polymer" means a polymer wherein the dispersed phase substantially comprises polymerized microdrops each having a core surrounded by a shell.

7. The term "latex" means a two-phase aqueous material comprising a polymeric phase dispersed in an aqueous phase. The latex is created by emulsion polymerization.

8. The terms "glass transition temperature" and "Tg" mean the temperatures at which a material changes from a brittle vitreous state to a rubbery state.

9. The terms "(meth)acrylate monomer", "methacrylic monomer" and the like means that both the methacrylic and acrylic acid versions or the equivalent are included in the group defined.

10. The term "optically clear" means an adhesive film having an optical transmission value of at least about 80%.

11. The term "tribocharging" means electrostatic charge generation associated with friction between separable surfaces.

12. The term "wafer" means a large disc consisting of many integrated circuits.

13. The term "chip" means an individual integrated circuit.

14. The term "water resistant" means that the antistatic tape will withstand the erosive and solvent action of jets of water used to wash microdevices supported on silicon wafers that are adhered by the tape to steel frames used in microfabrication processes.

As used herein, all parts, percents and ratios are by weight unless specifically stated otherwise.

DESCRIPTION OF THE DRAWING

The figure shows a graph in which the ordinate is surface resistivity and the abscissa is percent lithium nitrate for a formulation described and designated infra, as Example 6. As can be seen, the graph is relatively horizontal, that is, addition of additional lithium salt does not result in large changes in surface resistivity until a percentage of slightly above 1%, at which point the surface resistivity begins to change rapidly.

DETAILED DESCRIPTION OF THE INVENTION

Figure 1:
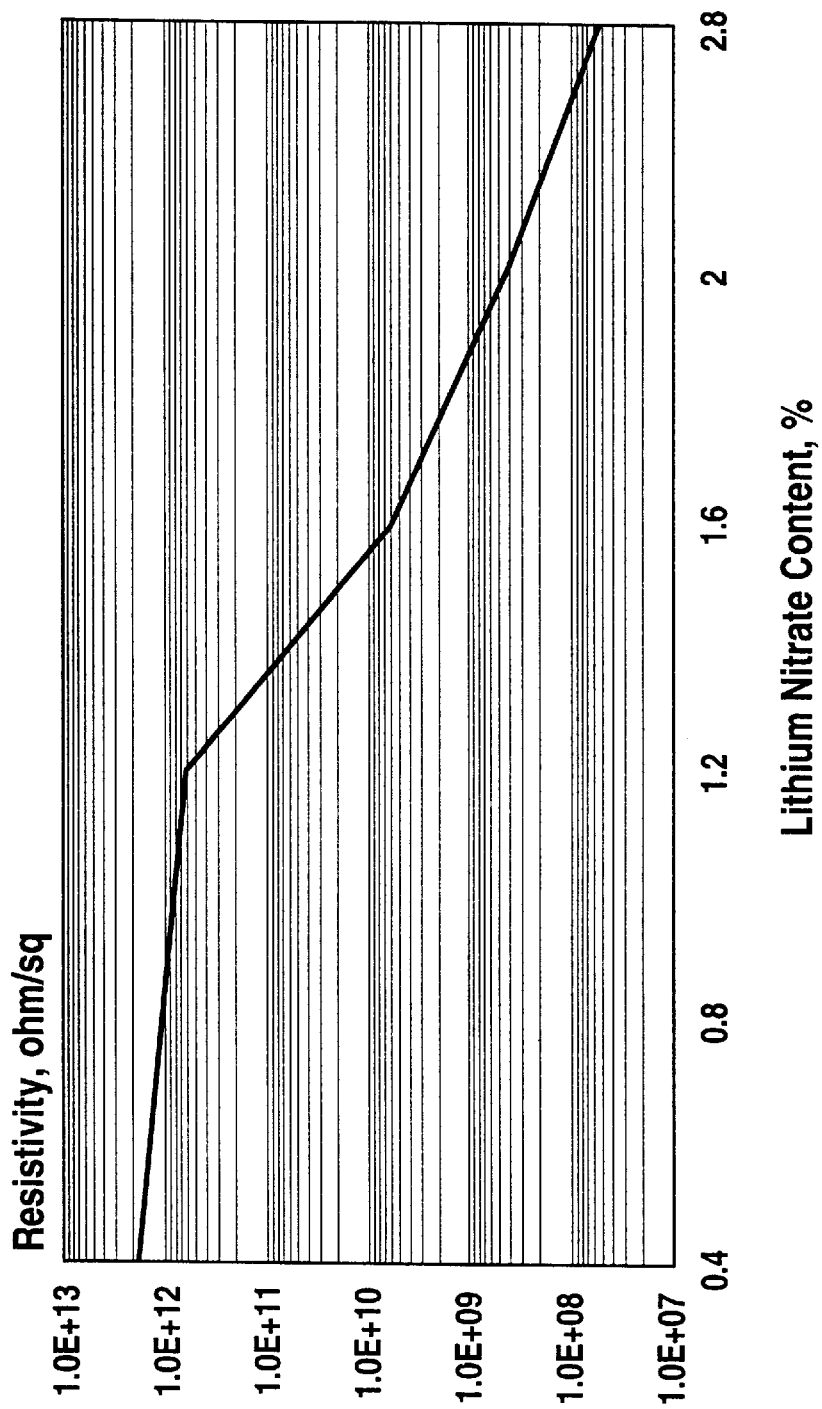

Alkyl acrylate or methacrylate monomers useful in preparing the latex and conductive pressure-sensitive adhesives of this invention are those monofunctional unsaturated acrylate or methacrylic esters of non-tertiary alkyl alcohols, the alkyl groups of which have from 4 to about 14 carbon atoms. Such acrylates are oleophilic, water emulsifiable, have limited water solubility, and as homopolymers, generally have glass transition temperatures below about −20° C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof. Acrylate or methacrylate or other vinyl monomers which, as homopolymers, have glass transition temperatures higher than about −20° C., e.g. tert-butyl acrylate, vinyl esters, methyl methacrylate, styrene, ethyl acrylate, methyl acrylate and the like, may be utilized in conjunction with one or more of the acrylate or methacrylate monomers provided that the glass transition temperature of the resultant polymer is below about 25° C., preferably below about 0° C.

Latex adhesives of the invention comprise from about 70 to about 97 weight percent of the $C_4$–$C_{14}$ (meth)acrylic monomer or mixture of monomers, preferably from about 75 to about 90 weight percent, and correspondingly from about 1 to about 30 weight percent polar monomer.

Useful vinyl ester monomers are those which form homopolymers having glass transition temperatures below about 70° C. Such esters comprise 1 to 14 carbon atoms, and include such monomers as vinyl 2-ethylhexanoate, vinyl acetate, vinyl caprate, vinyl laurate, vinyl pelargonate, vinyl hexanoate, vinyl propionate, vinyl decanoate, vinyl octanoate, and the like. Where vinyl monomers are used or lower alkyl, i.e., C1–C4 alkyl acrylate monomers, the useful amount is up to 40 weight percent, preferably up to 20 weight percent.

Polar monomers useful in latex adhesives of the invention include moderately polar monomers, such as N-vinyl-2-pyrrolidone, N-vinyl caprolactam, acrylonitrile, and diallyl phthalate, as well as strongly polar monomers such as acrylic acid, methacrylic acid, itaconic acid, hydroxyalkyl (meth)acrylates, cyanoalkyl acrylates, acrylamides, and substituted acrylamides, sodium styrene sulfonate and sodium vinyl sulfonate. When more than one polar monomer is used, mixtures may include monomers having similar or unlike polarities, e.g. one moderately polar and one strongly polar monomer or two monomers from one group. Useful amounts of polar monomer vary from about 1.0 weight percent to about 30 weight percent, preferably from about 1.0 weight percent to about 20 weight percent.

The composition includes at least one reactive oligomer having dual functionality. Dual functionality is important for successful practice of the invention. One aspect of the functionality provides unsaturation suitable for participating in free radical-type polymerization reactions. The second aspect of dual functionality resides in the alkoxy substituted moiety that is available, as an electron donor, to associate with positively charged ions.

While not wishing to be bound by theory, it is believed that during adhesive latex formation, unsaturated groups on the reactive oligomer react with acrylate monomers present in emulsion microdrops thereby becoming part of the copolymer comprising the polymerized microdrops. This results in the development of groups, attached to the copolymer backbone, that present alkoxy substituted moieties for interaction with positively charged ions. Thus, the dual nature of the reactive oligomer provides means for retaining effective distribution of alkoxy substitution throughout the coated adhesive latex. This ensures that ionic species, associated with the alkoxy groups, will contribute to the electrical conductivity of the adhesive and subdue significantly its tendency to tribocharge.

Suitable reactive oligomers include (meth)acrylate terminated polyethylene oxide, methoxy polyethylene oxide methacrylate, butoxy polyethylene oxide methacrylate, p-vinylbenzyl terminated polyethylene oxide, (meth)acrylate terminated polyethylene glycol, methoxy polyethylene glycol methacrylate, butoxy polyethylene glycol methacrylate, p-vinylbenzyl terminated polyethylene glycol, polyethylene oxide di(meth)acrylate and combinations thereof. Preferred examples of the heretofore mentioned oligomers include polyethylene oxide (meth)acrylate such as NK Ester AM90G and M90G, alkylene polyalkoxy sulfate, such as Mazon SAM211 from PPG Industries, polyoxyethylene alkylphenyl ether ammonium sulfate such as Hitenol HS, Hitenol A-10 from DKS International, Inc., alkylene polyalkoxy ethanol such as Mazon BSN 185, 186 and 187 from PPG Industries, and polyoxyethylene alkylphenyl ether such as Niogen RN 50 from DKS International, Inc. The reactive oligomer concentration in latex adhesives of the invention varies from about 0.5 weight percent to about 20 weight percent, preferably from about 1.0 weight percent to about 10 weight percent.

Formation of latex compositions of the invention requires an initiator. Useful initiators include water and oil soluble free radical initiators. Preferred water soluble initiators include potassium persulfate, ammonium persulfate, sodium persulfate and mixtures thereof. Such water soluble agents may be used alone, or in combination with reducing agents such as sodium bisulfite. Useful oil soluble initiators include peroxides such as benzoyl peroxide, lauroyl peroxide, and mixtures thereof, and diazo compounds such as 2,2'-azobis (isobutyronitrile), available commercially from DuPont as Vazo® 64, and 2,2'-azobis(2,4-dimethylpentanenitrile), available from DuPont as Vazo 52®.

The composition may contain surfactants useful as emulsion stabilizing agents. Examples of useful surfactants include anionic surfactants such as higher alkyl sulfates, alkylbenzenesulfonates, polyoxyethylene alkyl ether sulfates, polyoxyethylene alkylphenol ether sulfates and dialkyl succinates; useful nonionic surfactants include polyoxyethylene alkyl ethers, polyoxyethylene alkyl phenol ethers and polyoxyethylene/polyoxypropylene block copolymers.

Latex adhesives of the invention comprise at least one lithium salt. It is believed that the such salts become associated with electron donating groups that form part of the alkoxy substituted moiety. Suitable lithium salts include, but are not limited to LiCl, $LiNO_3$, $LiCF_3SO_3$, $Li_2SO_4$, LiOH and the like Lithium nitrate is preferred. Antistatic adhesives of the invention comprise at least about 1% lithium salt in order to provide the surface resistivities desired and low tribocharging characteristics. The exact minimum varies with the polymer composition and lithium salt used; however the effect of the lithium salts on such properties is minimal until the threshold amount is reached, and subsequent to this point, change occurs very rapidly such that effective adhesives can be formulated without affecting other desirable properties.

The latex adhesive of the present invention may comprise a crosslinking agent. Useful agents include multifunctional acrylates such as diacrylates, triacrylates, and tetraacrylates, e.g., 1.6-hexanedioldiacrylate, poly(ethylene glycol)-diacrylates, poly(butadiene)diacrylates, polyurethane diacrylates and trimethylolpropane triacrylate. Nonacrylate agents include 4-acryloxybenzophenone, divinyl benzene, and the like. Mixtures of crosslinkers may also be used. Multifunctional acrylates, poly(ethylene glycol)diacrylates, 4-acryloxybenzophenone, and mixtures thereof are preferred. Where a crosslinking agent is present, up to about 5 weight percent is useful, preferably up to about 2 weight percent.

Another optional ingredient is a chain transfer agent. Useful agents include carbon tetrabromide, mercaptans, alcohols, and mixtures thereof. Preferred agents include carbon tetrabromide, isooctyl thioglycolate, and mixtures thereof. Where used, the chain transfer agent is present in an amount of from about 0.1 up to about 1 weight percent, preferably from about 0.1 to about 0.5 weight percent.

Latex adhesives of the invention may be prepared by various methods depending upon the desired structure of the dispersed phase of polymerized microdrops. Where these polymerized microdrops have uniform composition, they may be prepared using a single step method. In one embodiment, the polymerized microdrop structure may combine a core element with an overlying shell element. The composition of the core element differs from that of the shell element. This embodiment requires a multistep preparation.

The single step method to form latex adhesive with dispersed polymerized microdrops having uniform composition, combines water, reactive oligomer, (meth) acrylate monomer mixture and any optional hydrophobic polymer. These ingredients, contained in a suitable vessel, provide an oil in water emulsion when homogenized in a Waring® blender. The blender operates at sufficiently high revolutions per minute to establish a stable emulsion with monomer microdrops less than 500 nm in diameter.

After transfer to a suitable reaction flask equipped with a stirrer, reflux condenser, nitrogen inlet and a thermometer, conversion of the blended composition to adhesive polymer occurs, in the presence of a suitable initiator, with stirring and the application of heat to the reaction flask. Heating proceeds with nitrogen gas flowing through the equipment to blanket the reacting composition. Thirty minutes after the main exothermic reaction, additional initiator is added and the temperature increased to a prescribed controlled temperature at which the polymerization continues for an extended time of about two hours. This reduces residual monomer in the adhesive latex. Thus formed, the adhesive latex provides the major component for coating formulations.

The preparation method which provides latex adhesives with core/shell type polymerized microdrops involves a polymerization reaction to form the core material and a subsequent step to substantially surround the core with a polymer shell selected for its low tribocharging characteristics. Components, including water, surfactant and (meth) acrylate monomer mixture comprise the composition to provide the core component. These ingredients, combined in a suitable vessel, provide an oil in water emulsion.

A reaction flask, equipped with a stirrer, reflux condenser, nitrogen inlet, metering pump and a thermometer, provides the vessel for polymerization of the emulsion of the core composition. This occurs with stirring and the application of heat to the reaction flask which optionally contains a solution of lithium hydroxide in de-ionized water. Heating proceeds with nitrogen gas flowing through the equipment to blanket the flask contents. At a controlled temperature of 80° C., addition of an initiator charge, comprising potassium persulfate, establishes an aqueous composition that causes polymerization of monomers comprising the emulsion of the core composition. The exothermic polymerization reaction is controlled to maintain the temperature at 80° C. Addition, by metering, of the emulsion of the core composition over a period of approximately sixty (60) minutes achieves the desired control. The resulting form of the reaction product is an adhesive emulsion having minute polymerized microdrops of adhesive dispersed in an aqueous medium.

A composition comprising a monomer premix of (meth) acrylate monomers and reactive oligomer provides the shell component of the core/shell latex adhesive. This monomer premix forms a shell coating over the adhesive core polymerized microdrops by metered addition over a period of ninety (90) minutes. This addition proceeds with continued stirring and temperature control at 80° C. During the addition of the monomer premix a polymerization reaction occurs between the premix and the previously polymerized core microdrops to produce a surface layer or shell around the core microdrops. In this way the core composition may differ from the shell composition to provide a variety of emulsions. Additional polymerization time of about two hours following the addition of a second charge of potassium persulfate initiator reduces undesirable residual monomer. Upon completion of the polymerization process and cooling to room temperature the reaction product is filtered through cheesecloth to remove gel agglomerates.

Antistatic formulations, suitable for coating, may require adjustment of the pH of the latex adhesives using, e.g. ammonium hydroxide. Addition of aqueous solutions containing lithium salts enhances the electrical conductivity of the latex adhesives and, thereby, their minimal tendency towards tribocharging. Benzotriazole addition prevents corrosion of metal surfaces that may come in contact with the adhesive formulations. Further modification of the properties of adhesive formulations of the invention results from addition of very small amounts of curatives such as pentaerythritol-tris-(β-(N-aziridinyl)-propionate available as XAMA® 7 from B. F. Goodrich, trimethylolpropane-tris-(β-(N-aziridinyl)-propionate available as XAMA® 2 also from B. F. Goodrich and trimethylolpropane-tris-(β-(N-aziridinyl)-propionate available as "CX-100" from Zeneca Resins. These curatives cause some crosslink formation in the adhesive formulation causing changes such as increased adhesive shear and/or reduced adhesion.

Tapes of the invention, especially useful in micro-device fabrication, may be produced by coating antistatic latex formulations on suitably prepared surfaces of flexible substrates. Suitable substrates include polymeric films such as biaxially oriented polypropylene, polyvinylidene chloride, polyvinyl chloride, polyesters, polyethylene terephthalate, polyetherimide and ionomers such as Surlyn™ available from DuPont Co.

Surface preparation of the substrate, before application of a latex coating formulation of the invention, includes the use of primers or binders. Preferred embodiments comprise a binder to ensure that adhesion between the substrate and the adhesive exceeds the adhesion between the adhesive and the electronic component to which it will be attached. Useful primers include phenolic resins, acrylic resins, rubbery components, block copolymers and mixtures thereof.

Where high temperature properties are required, a useful primer will comprise at least one phenolic resin and at least one rubbery component. Useful rubbery components include natural rubbers such as butyl rubbers and various synthetic compounds, including but not limited to, acrylonitrile-butadiene, acrylonitrile-butadiene-styrene copolymers, styrene-butadiene-styrene, styrene-ethylene butylene-styrene, polychloroprene, polybutadiene, polyisoprene, styrene-isoprene-styrene and mixtures thereof. Preferred primers either contain two or more rubbery compounds, such as acrylonitrile-butadiene and polychloroprene, or contain chlorinated polyolefins and polymers of epichlorohydrin with substituted phenols.

The following examples are for illustrative purposes only, and are not meant to limit the scope of the invention, which is expressed solely in the claims.

Test Methods

Surface Resistance Measurements of Antistatic Coatings

Surface Resistance is a measure of the intrinsic ability of a material to conduct electrons. It is a property which is independent of the dimensions of the material sample. The surface resistance of coatings of the invention was measured according to EOS/ESD Association Standard-S11.11- 1993 (Available from the Electrical Overstress/Electrostatic Discharge Association of Rome, N.Y.). A voltage source of 100 volts was used for measurements taken at 55% RH and 10% RH. Measurement involved contact between the resistance meter and the adhesive surface.

Peel Adhesion

Peel adhesion is the force required to remove an adhesive coated flexible sheet material from a test panel measured at a specific angle and rate of removal. In the examples, this force is expressed in Newtons per 100 mm width of coated sheet. The procedure followed is:

A strip 1.27 cm in width of the coated sheet is applied to the horizontal surface of a clean glass or stainless steel test plate with at least 12.7 lineal cm in firm contact. A 2 kg hard rubber roller is used to apply the strip. The free end of the coated strip is doubled back nearly touching itself so the angle of removal will be 180°. The free end is attached to the adhesion tester scale. The test plate is clamped in the jaws of a tensile testing machine which is capable of moving the plate away from the scale at a constant rate of 2.3 meters per minute. The scale reading in Newtons is recorded as the tape is peeled from the test plate surface. The data are reported as the average of the range of numbers observed during the test.

Tribocharging Measurements of Antistatic Coatings

The separation of materials, which have been laminated to each other, causes the generation of electrical charge on the surfaces which were previously in contact. It is possible to obtain the magnitude of the electrical charge as a measure of volts generated. Voltages were conveniently measured using a 3M 711 Charge Analyser, available from Minnesota Mining and Manufacturing Co. This equipment includes a voltage sensor, mounted in a suitable enclosure. The enclosure is provided with a digital read-out of voltage measured with respect to a stainless steel plate which is horizontally disposed and insulatively attached above the enclosure. Static charge development may be measured for adhesive tapes of the invention by laminating the tape with its adhesive face in contact with the surface of the stainless steel plate. Thus a strip of tape, 2.54 cms wide×15.24 cms long is applied to the upper surface of the stainless steel plate using a 2.0 Kg roller or sufficient finger pressure to displace the air between the stainless steel plate and the adhesive. The steel plate is then grounded to zero the digital display. Next, a free end of the tape is grasped and using a uniformly applied force, the tape is peeled away from the surface of the steel plate at a rate of 30.48 cms/sec. The voltage developed on the steel plate is displayed via digital read-out. After this reading is noted, the detector is zeroed by grounding the steel plate.

Next the tape, which was previously peeled from the steel plate, is positioned very close to the steel plate without touching it. A second reading of voltage is displayed which represents the voltage residing on the surface of the tape.

It is possible to determine the voltage generated during separation of adhesive tapes of the invention from a printed circuit board by attachment of a suitable board to the surface of the stainless steel plate. Adhesive tape is then attached to the circuit board using the procedure described previously for the steel plate. Upon peeling the tape from the circuit board a voltage reading is displayed which reflects the charge generated on the surface of the circuit board. Following the process of zeroing the instrument, by grounding, the residual charge on the tape is measured by positioning the peeled tape in close proximity to the steel plate.

Tribocharging during unwind of a roll of tape is also measured using the 3M 711 Charge Analyser. In this case a length of tape approximately 30.48 cms long is unwound from a roll of adhesive tape but not removed from it. When the unwound length is placed in close proximity to the previously grounded steel plate, a voltage reading is displayed which represents the magnitude of the charge on the tape.

Method of Latex Polymer Preparation

Components, including water (53.3), reactive oligomer (2.5) and monomer mixture (IOA 89/VAc 6/AA 3) and hydrophobic polymer (polystyrene 2) comprise the composition for conversion to an adhesive latex. These ingredients, combined in a suitable vessel, provide an oil in water emulsion when homogenized in a Waring® blender. The blender operates at sufficiently high revolutions per minute to establish a stable emulsion with emulsion microdrops less than 500 nm in diameter.

After transfer to a suitable reaction flask equipped with a stirrer, reflux condenser, nitrogen inlet and a thermometer, conversion of the blended composition to adhesive polymer occurs with stirring and the application of heat to the reaction flask. Heating proceeds with nitrogen gas flowing through the equipment to blanket the reacting composition. At 32° C., addition of half the initiator to the reaction flask, causes the temperature to rise under the influence of an exothermic polymerization reaction.

Thirty minutes later, the remaining initiator is added, the temperature is increased to 75° C., and the polymerization reaction advances for two more hours. This reduces residual monomer in the adhesive latex which, after cooling, has the necessary characteristics for coating on selected substrates to provide an adhesive tape of the invention.

The adhesive, as prepared, is 54% solids in water producing a fluid of 700 cps viscosity at pH 5.3. Property measurement shows that the latex itself is not electrically conductive since, at 55% RH it possesses a surface resistance of $2.2 \times 10^{12}$ and generates electrostatic charge in the region of 1,700 volts when separated from a stainless steel test surface.

Detailed Method of a Core/Shell Latex Adhesive Polymer Preparation

Components, including monomer mixture, surfactant and water in amounts as described in Table 5, entries D, E, F, G and H comprise the reactive dispersion wherein the core component of a core/shell latex adhesive forms.

Similar starting materials, again as described in Table 5 entries I, J, K and L, provide the shell component of the core/shell latex adhesive. A monomer premix of these materials represents a mixture for addition to the reaction flask after preparation of the core component.

A reaction flask, equipped with a stirrer, reflux condenser, nitrogen inlet, metering pump and a thermometer, provides the vessel for polymerization of the core composition emulsion microdrops. This occurs with stirring and the application of heat to the reaction flask which contains de-ionized water and optionally lithium hydroxide. Heating proceeds with nitrogen gas flowing through the equipment to blanket the flask contents. At a controlled temperature of 80° C., addition of an initiator charge, comprising potassium persulfate, establishes an aqueous composition that causes polymerization of monomers comprising the core composition emulsion microdrops. The exothermic polymerization reaction must be controlled to maintain the temperature at 80° C. Addition, by metering, of the core composition emulsion over a period of approximately sixty (60) minutes achieves the desired control. The resulting form of the reaction product is an adhesive emulsion having minute polymerized microdrops of adhesive polymer dispersed in an aqueous medium. A shell coating is next formed over the adhesive polymerized microdrops by metered addition of monomer premix over a period of ninety (90) minutes. This addition proceeds with continued stirring and temperature control at 80° C. During the addition of the monomer premix a polymerization reaction occurs between the premix and the previously polymerized microdrops to produce a surface layer or shell around the particles. In this way the core composition may differ from the shell composition to provide a variety of emulsions. It is advantageous to reduce residual monomer concentration to a minimum by extension of the polymerization reaction. The additional polymerization time is about two hours following the addition of a second charge of potassium persulfate initiator. Upon completion of the polymerization process and cooling to room temperature the reaction product is filtered through cheesecloth to remove gel agglomerates.

EXAMPLES 1–3 and COMPARATIVE EXAMPLE C4

A latex adhesive was made according to the above method having the following composition (See Table 1). The emulsion was then formed into 3 different adhesive coating formulations by the addition of varying amounts of lithium salt. Prior to coating, the pH of the adhesives was adjusted to pH 7.2 using concentrated, i.e. 25–30%, ammonium hydroxide and 8% lithium hydroxide solutions. Benzotriazole was added to prevent corrosion of metal surfaces that may come in contact with the adhesive formulations.

The resulting adhesive formulation is coated with a knife coater on a primed polyester film surface (poly(ethylene terephthalate)), then dried with hot air at 95° C. to yield an adhesive having a dry thickness of 25 micrometers. Selection of suitable lengths of adhesive tape facilitates testing to determine adhesion level, resistivity and electrostatic charge generation or tribocharging. Comparative Example C4 is a microparticle antistatic adhesive available from 3M Company as #40 tape.

TABLE 1

Adhesive Composition

| Component | Amount (parts) |
|---|---|
| Isooctylacrylate | 89 |
| VAC (Vinyl Acetate) | 6 |
| Acrylic Acid | 3 |
| PS (Polystyrene) | 2 |
| Mazon SAM211 | 2.5 |

TABLE 2

Adhesive Coating Formulations (parts)

| Example No. | 1 | 2 | 3 |
|---|---|---|---|
| Emulsion Adhesive | 100 | 100 | 100 |
| Lithium Nitrate | 0.6 | 1.2 | 2.4 |
| Lithium Hydroxide | 0.28 | 0.28 | 0.28 |
| Ammonium Hydroxide | 0.7 | 0.7 | 0.7 |
| Benzotriazole | 0.05 | 0.05 | 0.05 |

TABLE 3

Adhesive Tape Properties

| Test Sample | 1 | 2 | 3 | C4 |
|---|---|---|---|---|
| Adhesion (Newtons/100 mm) | 15.6 | 13.3 | 14.5 | 15.6 |
| Surface Resistance at 55% RH | $3 \times 10^8$ | $4.8 \times 10^6$ | $1.2 \times 10^5$ | — |
| Tribocharge on Stainless Steel at 55% RH | 56 volts | 14 volts | 25 volts | — |
| Surface Resistance at 10% RH | $2 \times 10^{11}$ | $2 \times 10^{10}$ | $4 \times 10^7$ | $2.7 \times 10^9$ |
| Tribocharge on Stainless Steel at 10% RH | 1150 volts | 600 volts | 15 volts | 245 volts |
| Tribocharge on Board | 2 volts | 1.5 volts | 3 volts | 100 volts |

A test sample of an adhesive of the invention having the formulation described as Example 3 was prepared on biaxially oriented polypropylene (BOPP), giving the results shown in Table 4. This tape also exhibited desired antistatic properties.

TABLE 4

Adhesive Tape Properties on BOPP

| Test Sample | 3 |
|---|---|
| Adhesion (Newtons/100 mm) | 14.4 |
| Surface Resistance at 10% RH | $5.2 \times 10^7$ |
| Tribocharge on Stainless Steel at 10% RH | 15 volts |

EXAMPLES 5–8

Core/shell latex adhesives of the invention were prepared, according to the method previously described, using compositions shown in Table 5. The pH was then adjusted, optional ingredients and water added to form coating formulations shown in Table 6 and coated onto a primed Surlyn® 1652 film to provide adhesive tapes of the invention. Surlyn® 1652, an ionomer, is an ethylene acid copolymer film available from DuPont, in which the acid groups are partially neutralized by zinc.

The adhesive tapes were then tested for surface resistivity, tribocharging and adhesion to steel, and the properties are shown in Table 7.

TABLE 5

Adhesive Polymer Compositions

| Example No. | 5 | 6 | 7 | 8 |
|---|---|---|---|---|
| A Deionized Water | 500 | 500 | 1300 | 506 |
| B Lithium Hydroxide | 9.5 | 9.5 | 9.5 | 9.5 |
| C Potassium Persulfate | 5.0 | 5.0 | 5.0 | 5.0 |
| D Deionized Water | 1135 | 1135 | 333 | 1135 |
| E Siponate® DS-10 | 5.0 | 5.0 | 5.0 | 5.0 |
| F Butyl Acrylate | 460 | 435 | 410 | 385 |
| G Methyl Methacrylate | 25 | 50 | 75 | 100 |
| H Methacrylic Acid | 15 | 15 | 15 | 15 |
| I Butyl Acrylate | 1380 | 1305 | 1230 | 1155 |
| J Methyl Methacrylate | 75 | 150 | 225 | 300 |
| K Methacrylic Acid | 45 | 45 | 45 | 45 |
| L Mazon "SAM211-80" | 150 | 150 | 150 | 150 |
| M Potassium Persulfate | 1.0 | 1.0 | 1.0 | 1.0 |

TABLE 6

Core/Shell Adhesive Coating Formulations

| Emulsion Formulation | Ex. 5 | Ex. 6 | Ex. 7 | Ex. 8 |
|---|---|---|---|---|
| Adhesive (parts) | 100 | 100 | 100 | 100 |
| Lithium Nitrate (parts) | 1.8 | 1.8 | 1.8 | 1.8 |
| Lithium Hydroxide (parts) | 0.1 | 0.1 | 0.1 | 0.1 |
| Ammonium Hydroxide (parts) | 0.3 | 0.3 | 0.3 | 0.3 |
| XAMA®-7 (parts) | 0.07 | 0.07 | 0.07 | 0.07 |
| Deionized Water (parts) | 10 | 10 | 10 | 10 |
| Percent Solids | 50.7 | 50.7 | 50.7 | 50.7 |
| pH | 7.7 | 8.0 | 7.7 | 7.8 |
| Viscosity, cps | 38 | 45 | 45 | 72 |

TABLE 7

Adhesive Tape Properties (Surlyn® Film)

| Property | Example 5 | Example 6 | Example 7 | Example 8 |
|---|---|---|---|---|
| Total Thickness (mil) | 2.32 | 2.30 | 2.4 | 2.35 |
| Film Thickness (mil) | 2.0 | 2.0 | 2.0 | 2.0 |
| Adhesive Thickness (mil) | 0.32 | 0.3 | 0.4 | 0.35 |
| Adhesion to Steel (Newtons/100 mm) | 4.0 | 2.8 | 2.4 | 1.8 |
| Adhesion to Silicon (Newtons/100 mm) | 3.90 | 1.30 | 0.91 | 0.83 |
| Surface Resistivity (ohm/sq) at 55% RH | $6.3 \times 10^7$ | $2.3 \times 10^7$ | $1.5 \times 10^7$ | $1.2 \times 10^7$ |
| Tribocharge (volts) from Stainess Steel at 55% RH | 13 | 7 | 2 | 1 |
| Tribocharge (volts) from Silicon Wafer at 55% RH | 10 | 13 | 12 | 7 |
| Surface Resistivity (ohm/sq) at 10% RH | $7.3 \times 10^{10}$ | $1.1 \times 10^{10}$ | $2.0 \times 10^9$ | $2.2 \times 10^9$ |
| Tribocharge (volts) from Stainless Steel at 55% RH | 80 | 8 | 5 | 4 |
| Tribocharge (volts) from Silicon Wafer at 10% RH | 8 | 4 | 3 | 3 |

COMPARATIVE EXAMPLES C9–11 AND EXAMPLES 12–14

The latex adhesive composition of Example 6 (in Table 5) was made into a variety of coating formulations by varying the amount of lithium salt, e.g., lithium nitrate, present and the surface resistivities and tribocharging results are shown in Table 8; as can be seen, more than about 1.6 parts per 100 parts of adhesive is required to provide good antistatic properties. This level will vary somewhat with the polymer selection, and specific lithium salt. The data in Table 8 is also conveyed visually in FIG. 1 to show the dramatic improvement in surface resistivity after the minimum lithium salt amount is reached.

TABLE 8

Properties as a Function of Lithium Nitrate Addition

| Ex. | Weight Percentage Lithium Nitrate | Surface Resistivity (ohms/sq) at 10% RH | Tribocharge (volts) from Stainless Steel at 10% RH | Adhesion to Steel Newtons/100 mm |
|---|---|---|---|---|
| 9C | 0.36 | $1.8 \times 10^{13}$ | 1800 | 14 |
| 10C | 0.72 | $1.0 \times 10^{13}$ | 1200 | 9.2 |
| 11C | 1.07 | $5.6 \times 10^{12}$ | 1000 | 1.8 |
| 12 | 1.43 | $5.8 \times 10^{10}$ | 98 | 2.4 |
| 13 | 1.78 | $4.1 \times 10^9$ | 8 | 5.2 |
| 14 | 2.47 | $6.0 \times 10^8$ | 5 | 1.9 |

Table 9 shows particularly the changes in tribocharging associated with changes in reactive oligomer concentration in the latex adhesive composition. Polymerized microdrops, in this case were uniform in composition. Addition of M90G and/or Mazon SAM 211 provide greater benefits than addition of RN50.

TABLE 9

Effect of Reactive Oligomers on Antistatic Properties

| | Latex Composition | | | | Surface Resisitivity | Tribocharge (volts) from Stainless Steel |
|---|---|---|---|---|---|---|
| Ex. | BA | HEA | M-90G | RN50 | SAM211 | @ 10% RH | @ 10% RH |
| 15 | 80 | 20 | 3 | — | — | $4.3 \times 10^{10}$ | 8 |
| 16 | 80 | 20 | — | 3 | — | $3.6 \times 10^{10}$ | 101 |
| 17 | 80 | 20 | 3 | — | 2 | $4.5 \times 10^{10}$ | 12 |

Table 10 shows that control of electrostatic charge generation by adhesive tapes of the invention is just as effective when the reactive oligomer is present in the shell of core/shell polymerized microdrops as when it is present throughout the polymerized microdrop, as shown in Table 9. Tapes having consistently low tribocharging properties can be produced with relatively low to relatively high adhesions.

TABLE 10

Effect of Polymer Compositions of Core/Shell Latex PSA on Adhesive and Antistatic Properties

| | Core Composition | | | | Shell Composition | | | | | | | Peel Adhesion (Newtons/ | Surface Resistivity @ | Tribocharge (volts) from Stainless Steel @ |
|---|---|---|---|---|---|---|---|---|---|---|---|---|---|---|
| Ex. | BA | MMA | MAA | HDDA | BA | MMA | HEA | M-90G | SAM211 | HDDA | C/S Ratio | 100 mm) | 10% RH | 10% RH |
| 18 | 97 | — | 3 | — | 75 | 10 | 15 | 3 | 4 | — | 80/20 | 24 | $1.2 \times 10^{10}$ | 19 |
| 19 | 76 | 20 | 3 | 1 | 75 | 10 | 15 | 3 | 4 | — | 80/20 | 14.2 | $1.3 \times 10^{10}$ | 7 |
| 20 | 97 | — | 3 | — | 67 | 10 | 15 | 0 | 8 | 0.2 | 25/75 | 8.8 | $1.3 \times 10^{9}$ | 20 |
| 21 | 95 | — | 3 | 2 | 65 | 20 | 15 | 3 | 2 | — | 80/20 | 5.4 | $4.6 \times 10^{9}$ | 18 |
| 22 | 95 | — | 3 | 2 | 55 | 40 | 5 | 3 | 2 | — | 80/20 | 3.3 | $1.5 \times 10^{9}$ | 5 |
| 23 | 95 | — | 3 | 2 | 35 | 60 | 5 | 3 | 2 | — | 80/20 | 4.4 | $4.1 \times 10^{9}$ | 33 |

We claim:

1. A water resistant, antistatic pressure-sensitive adhesive tape suitable for use in microfabrication processes comprising a flexible substrate having opposing surfaces at least one surface bearing thereon a clear continuous coating of adhesive, said coating formed by coalescence of polymerized microdrops, said polymerized microdrops comprising reactive monomers, including from about 70 to about 97 weight percent of at least one (meth)acrylate monomer, at least on reactive oligomer having dual functionality and at least about 1.0 weight percent of a lithium salt, said adhesive having an adhesion to steel of from about 0.5 Newtons/100 mm (N/100 mm) to about 30 N/100 mm.

2. An adhesive tape according to claim 1 having a primer interposed between said at least one surface and said adhesive.

3. An antistatic pressure sensitive adhesive tape according to claim 1 wherein a majority of said polymerized microdrops have an inner core differing in composition from an overlying shell that substantially surrounds said inner core, wherein the core has a glass transition temperature of from about −120° C. to about 25° C., and said overlying shell includes means to subdue static charge, said inner core and overlying shell being derived from compositions formed from reactive monomers including at least one (meth)acrylic monomer, said latex further comprising from about 0.5 to about 20 weight percent of a reactive oligomer.

4. An antistatic pressure sensitive adhesive tape according to claim 1 wherein said flexible substrate is selected from the group consisting of biaxially oriented polypropylene, polyvinylidene chloride, polyvinyl chloride, polyesters, polyethylene terephthalate, polyetherimide and ionomers.

5. An antistatic pressure sensitive adhesive tape according to claim 2 wherein said said primer is selected from the group consisting of acrylonitrile-butadiene, acrylonitrile-butadiene-styrene copolymers, styrene-butadiene-styrene, styrene-ethylene butylene-styrene, polychloroprene, polybutadiene, polyisoprene, styrene-isoprene-styrene acrylonitrile-butadiene and copolymers of epichlorohydrin with substituted phenols.

* * * * *